United States Patent
Zabulon et al.

(10) Patent No.: US 10,969,247 B2
(45) Date of Patent: Apr. 6, 2021

(54) METHOD OF MEASURING A POSITION OF A MOVABLE BODY RELATIVE TO A FIXED BODY

(71) Applicants: SAFRAN LANDING SYSTEMS, Velizy Villacoublay (FR); SAFRAN ELECTRONICS & DEFENSE, Boulogne Billancourt (FR)

(72) Inventors: Joël Zabulon, Velizy-Villacoublay (FR); David Frank, Velizy-Villacoublay (FR); Thierry Bickard, Boulogne Billancourt (FR)

( * ) Notice: Subject to any disclaimer, the term of this patent is extended or adjusted under 35 U.S.C. 154(b) by 0 days.

(21) Appl. No.: 17/040,842

(22) PCT Filed: Mar. 21, 2019

(86) PCT No.: PCT/EP2019/057169
§ 371 (c)(1),
(2) Date: Sep. 23, 2020

(87) PCT Pub. No.: WO2019/180182
PCT Pub. Date: Sep. 26, 2019

(65) Prior Publication Data
US 2021/0041269 A1 Feb. 11, 2021

(30) Foreign Application Priority Data
Mar. 23, 2018 (FR) .................................... 1852510

(51) Int. Cl.
*G01D 5/20* (2006.01)
*B64F 5/60* (2017.01)

(52) U.S. Cl.
CPC ............... *G01D 5/206* (2013.01); *B64F 5/60* (2017.01)

(58) Field of Classification Search
CPC ...... G01D 5/204; G01D 5/206; G01D 5/2053; G01D 5/2073; B64F 5/60
See application file for complete search history.

(56) References Cited

U.S. PATENT DOCUMENTS

2007/0257667 A1* 11/2007 Schroeder ............ G01D 5/2073
324/207.17
2012/0313565 A1* 12/2012 Ortman ................ G01D 5/2073
318/611
(Continued)

FOREIGN PATENT DOCUMENTS

DE 19738836 A1 3/1999
DE 102016202859 B3 6/2017
(Continued)

*Primary Examiner* — Steven L Yeninas
(74) *Attorney, Agent, or Firm* — Muncy, Geissler, Olds & Lowe, P.C.

(57) ABSTRACT

A measurement method for measuring the position of a movable body that is movable relative to a fixed body, the measurement method making use of a measurement device comprising a fixed portion for securing to the fixed body and a movable portion for securing to the movable body, the fixed portion including a first printed circuit (7; 20) having formed thereon first tracks (9) defining at least one emission pattern (10; 24) and also a plurality of measurement patterns (11; 25), the movable portion including a second printed circuit (8; 21) having formed thereon second tracks (14) defining at least one reception pattern (15; 27) and also at least one target pattern (16; 28), the first and second printed circuits being coupled together electromagnetically in such a manner that, when the emission pattern is excited by an excitation signal, an induced signal is received by the reception pattern and is then re-emitted by the target pattern, the measurement patterns then picking up measurement signals that are representative of the position of the target (Continued)

pattern, and thus also of the second printed circuit, of the movable portion, and of the movable body.

12 Claims, 3 Drawing Sheets

(56) References Cited

U.S. PATENT DOCUMENTS

| | | | |
|---|---|---|---|
| 2017/0074682 A1* | 3/2017 | K ntor | G01D 5/2053 |
| 2018/0274948 A1* | 9/2018 | Maniouloux | G01P 3/49 |
| 2019/0226828 A1* | 7/2019 | Lugani | G01B 7/003 |
| 2019/0226877 A1* | 7/2019 | Kluge | G01D 5/2053 |
| 2019/0331541 A1* | 10/2019 | Janisch | B62D 1/046 |

FOREIGN PATENT DOCUMENTS

| | | |
|---|---|---|
| DE | 102016202871 B3 | 6/2017 |
| WO | WO-2017/144638 A1 | 8/2017 |

\* cited by examiner

METHOD OF MEASURING A POSITION OF A MOVABLE BODY RELATIVE TO A FIXED BODY

The invention relates to the field of methods of measuring the position of a movable body relative to a fixed body.

BACKGROUND OF THE INVENTION

A modern system for braking aircraft landing gear wheels conventionally employs an anti-skid function for wheels to which braking is applied (referred to as "braked" wheels).

The anti-skid function seeks to detect when the braked wheels begin to lock and to adapt the braking to avoid them locking.

For each braked wheel, the braking system includes a tachometer that produces a measurement of the "instantaneous" speed of rotation of the braked wheel. The measured speed of rotation is used to detect when said braked wheel begins to lock.

A traditional tachometer for a braked aircraft wheel includes a passive sensor, e.g. a variable reluctance sensor. The passive sensor thus comprises a coil having terminals across which a measurement voltage is induced, which voltage is representative of the speed of rotation of the wheel.

In order to improve the accuracy and the sensitivity with which the speed of rotation is measured at low speeds, attempts have been made to design such tachometers making use of technologies derived from the field of encoders. Specifically encoders are in widespread use in industry for measuring the speeds of rotation of rotating bodies.

Such encoders either produce an angular position on a digital bus (these encoders being said to be "absolute" encoders), or else they generate pulses or "beeps" at regular intervals (these encoders being said to be "incremental" encoders). The sensors used for making such encoders are mainly optical sensors or magnetic sensors (and in particular Hall effect sensors).

Optical technology suffers from a main drawback of being sensitive to dirt, and thus of being unsuitable for use in the environment of a braked wheel of an aircraft, in which carbon dust coming from wear of the brake is present in large quantities. Furthermore, the large temperature fluctuations associated with the temperature of the brake rising during landing and with the temperature of the brake falling in flight give rise to materials cycling through expansions and contractions, which have the effects of reducing the effectiveness of sealing gaskets and also, over time, of degrading the performance of sensors.

Thus, it is generally preferred to use magnetic technology in such an environment.

Hall effect sensors are also more sensitive to the environment than are passive sensors. In particular, their transfer functions change with temperature and they present great sensitivity to manufacturing conditions. Furthermore, the principle of Hall effect measurement requires the presence of magnets that present characteristics that are accurate and stable over time. The calibration and compensation functions that are necessary for using such sensors make this technology more complicated and increase its cost.

OBJECT OF THE INVENTION

An object of the invention is both to improve the reliability and the stability over time of measuring the position of a movable body relative to a fixed body, and also to reduce the associated complexity and cost, such position measurement being suitable for use in estimating the speed of rotation of a wheel of a vehicle such as an aircraft.

SUMMARY OF THE INVENTION

In order to achieve this object, there is provided a measurement method for measuring the position of a movable body that is movable relative to a fixed body, the measurement method making use of a measurement device comprising a fixed portion for securing to the fixed body and a movable portion for securing to the movable body, the fixed portion including a first printed circuit having formed thereon first tracks defining at least one emission pattern and also a plurality of measurement patterns, the movable portion including a second printed circuit having formed thereon second tracks defining at least one reception pattern and also at least one target pattern, the first and second printed circuits being coupled together electromagnetically in such a manner that, when the emission pattern is excited by an excitation signal, an induced signal is received by the reception pattern and is then re-emitted by the target pattern, the measurement patterns then picking up measurement signals that are representative of the position of the target pattern, and thus also of the second printed circuit, of the movable portion, and of the movable body, the measurement method comprising the steps of:

determining a first measurement pattern that is the measurement pattern closest to the target pattern, the first measurement pattern picking up a first measurement signal that presents the greatest amplitude from among all the measurement signals;

determining a second measurement pattern that is the measurement pattern that is the next closest to the target pattern after the first measurement pattern, the second measurement pattern picking up a second measurement signal; and defining the position of the target pattern as a function of the position of the first measurement pattern or of the second measurement pattern, and as a function of the first measurement signal and of the second measurement signal.

Using first and second printed circuits that are coupled together electromagnetically constitutes a solution that is simple provide, that is inexpensive, and that presents good stability over time. Furthermore, because it presents great reproducibility in manufacture, this solution does not make it essential to perform a calibration operation.

There is also provided a measurement method as described above, further comprising the preliminary step of storing position values for the target pattern in a table in memory, each position value being associated with a value representative of the difference between the amplitude of the first measurement signal and the amplitude of the second measurement signal.

There is also provided a measurement method as described above, wherein the movable body is a body rotatable about an axis of rotation, and wherein the position of the movable body is an angular position.

There is also provided a measurement method as described above, wherein each of the emission pattern and the reception pattern presents a respective axis of revolution that coincides with the axis of rotation of the movable body.

There is also provided a measurement method as described above, wherein the emission pattern lies in the proximity of a circumference of the first printed circuit, and wherein the reception pattern lies in the proximity of a circumference of the second printed circuit.

There is also provided a measurement method as described above, wherein the emission pattern lies at the center of the first printed circuit, and wherein the reception pattern lies at the center of the second printed circuit.

There is also provided a measurement method as described above, the measurement patterns being angularly distributed in regular manner in the proximity of a circumference of the first printed circuit, and the target pattern being positioned in the proximity of a circumference of the second printed circuit.

There is also provided a measurement method as described above, the measurement device also being arranged to measure the speed of the movable body.

There are also provided a measurement method as described above, wherein at least one pattern from among the emission pattern, the measurement patterns, the reception pattern, and the target pattern is a coil.

There is also provided a measurement method as described above, the movable body being a vehicle wheel mounted on an axle in order to rotate about an axis of rotation, the fixed portion being for securing to the axle and the movable portion being for being driven in rotation by the wheel.

There are also provided a measurement method as described above, the measurement device being integrated in a tachometer.

There is also provided a measurement method as described above, the tachometer being arranged to measure the speed of rotation of a wheel of aircraft landing gear.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
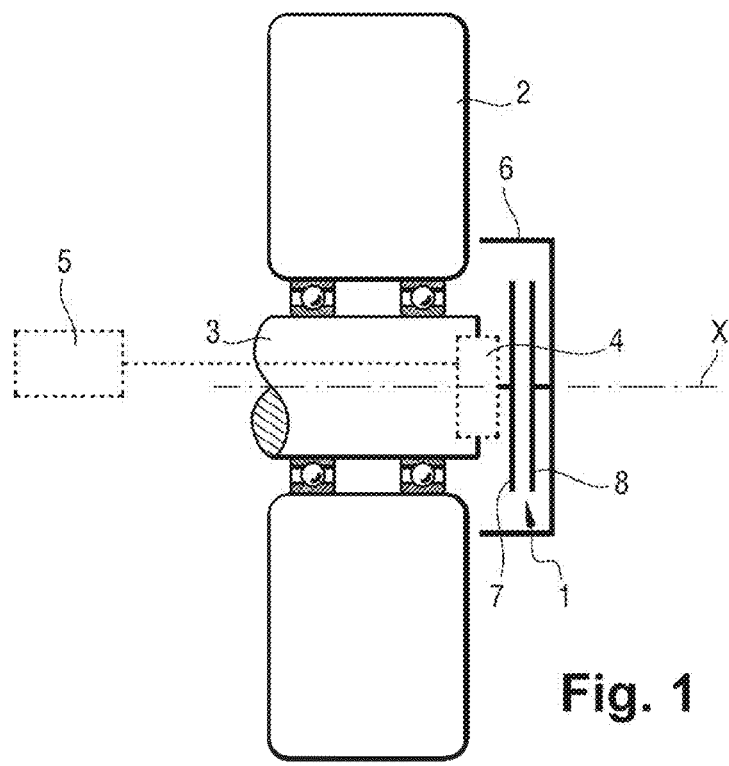
FIG. 1 shows a braked wheel of aircraft landing gear and a first embodiment of a measurement device.

With reference to FIG. 1, the measurement device 1 in a first embodiment is integrated in a tachometer of a braked wheel 2 of aircraft landing gear. The braked wheel 2 is mounted on an axle 3 of the landing gear to rotate about an axis of rotation X, which axis is also the axis of the axle 3.

The measurement device 1 is for measuring the angular position and the speed of rotation of the braked wheel 2. In addition to the measurement device 1, the tachometer includes an electronic processor unit 4 connected to the braking system 5.

The measurement device 1 comprises a fixed portion for securing to the axle 3 and a movable portion for being driven in rotation by the braked wheel 2.

The fixed portion and the electronic processor unit 4 are positioned at one end of the axle 3. The movable portion is fastened to and integrated in a wheel cover 6 that lies, relative to the braked wheel 2, on its side opposite from its side next to the brake. The wheel cover 6 is constrained to rotate with the braked wheel 2 and it serves to protect the inside of the axle 3.

The fixed portion of the measurement device 1 includes a first printed circuit 7, and the movable portion of the measurement device 1 includes a second printed circuit 8. The first printed circuit 7 and the second printed circuit 8 are positioned in parallel facing each other, and they are spaced apart by a distance that typically lies in the range 0.5 millimeters (mm) to 10 mm.

Figure 2:
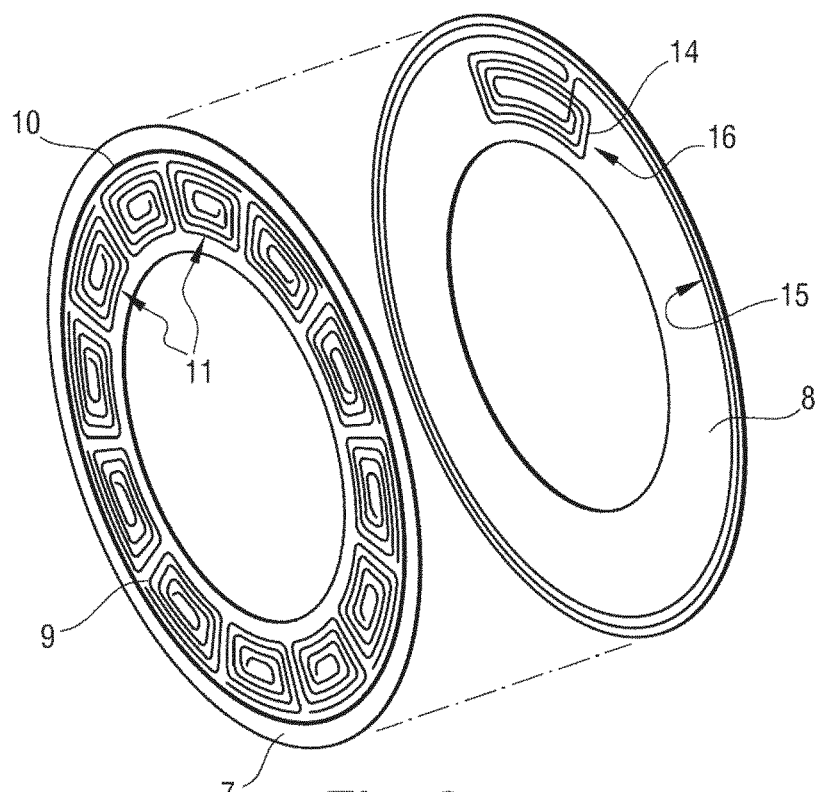
FIG. 2 shows first and second printed circuits of the first embodiment of the measurement device.
Figure 3:
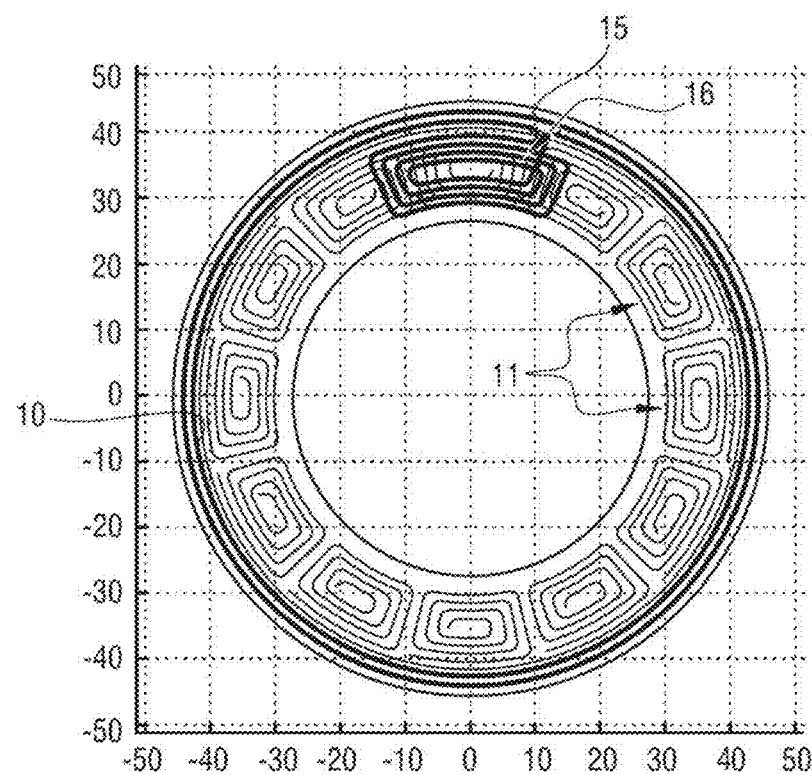
FIG. 3 shows first tracks of the first printed circuit superposed on second tracks of the second printed circuit.

In this example, and with reference to FIGS. 2 and 3, both the first printed circuit 7 and the second printed circuit 8 are annular in shape.

First copper tracks 9 are formed on the first printed circuit 7. In this example, the first tracks 9 are etched in the first printed circuit 7. The first tracks 9 define an emission pattern 10 and also a plurality of measurement patterns 11, specifically twelve measurement patterns 11.

The emission pattern 10 lies in the proximity of a circumference of the first printed circuit 7, and the measurement patterns 11 are distributed angularly in regular manner in the proximity of the circumference of the first printed circuit 7.

The emission pattern 10 presents an axis of revolution. When the tachometer is installed on the landing gear, the axis of revolution coincides with the axis of rotation X of the wheel, i.e. with the axis of the axle 3. In this example, the emission pattern 10 is a coil comprising a plurality of turns formed by a first track 9 of the first printed circuit 7. Each turn forms a circle of diameter close to the major diameter of the first printed circuit 7.

In this example, each measurement pattern 11 is a coil comprising a plurality of turns formed by a first track 9 of the first printed circuit 7.

The electronic processor unit 4 is connected to the emission pattern 10 and to the measurement patterns 11.

Second copper tracks 14 are formed in the second printed circuit 8. In this example, the second tracks 14 are etched in the second printed circuit 8. The second tracks 14 define a reception pattern 15 and also a target pattern 16.

The reception pattern 15 lies in the proximity of a circumference of the second printed circuit 8, and the target pattern 16 is positioned in the proximity of the circumference of the second printed circuit 8. The reception pattern 15 and the target pattern 16 are connected together by second tracks 14.

The reception pattern 15 presents an axis of revolution that coincides with the axis of rotation X of the wheel, i.e. with the axis of the axle 3. In this example, the reception pattern 15 is a coil comprising a plurality of turns formed by a second track 14 in the second printed circuit 8.

Each turn forms a circle of diameter close to the major diameter of the second printed circuit 8.

In this example, the target pattern 16 is a coil comprising a plurality of turns formed by a second track 14 of the second printed circuit 8.

The electronic processor unit 4 generates an excitation signal and excites the emission pattern 10 with the excitation signal. The excitation signal is an electrical signal alternating at high frequency. The first and second printed circuits 7 and 8 are coupled together electromagnetically in such a manner that when the emission pattern 10 is excited by the excitation signal, an induced signal is received by the reception pattern 15. Specifically, the electromagnetic coupling is inductive coupling.

The induced signal comprises a current I(t) flowing in the reception pattern 15 and in the target pattern 16 of the second printed circuit 8.

In accordance with the Biot-Savart law, excitation of the target pattern 16 by the current I(t) produces a magnetic field B(t) at a point M in three-dimensional space:

$$\overrightarrow{B(t)} = \frac{\mu_0}{4\pi} \int_P I(t). \ \overrightarrow{dl} \wedge \frac{\overrightarrow{PM}}{PM^3} = \frac{\mu_0}{4\pi} I(t) \int_P \overrightarrow{dl} \wedge \frac{\overrightarrow{PM}}{PM^3}$$

This magnetic field B(t) causes an electromotive force to appear in each coil of the measurement patterns 11 of the first printed circuit 7 (Faraday's law and Lenz's law). The electromotive force that appears in each coil of the measurement patterns 11 is a function of the magnetic flux $\phi(t)$ passing through the coil:

$$e = -\frac{d\phi}{dt}$$

The magnetic flux through each coil is:

$$\phi(t) = \int\int_S \overrightarrow{B(t)}. \ \overrightarrow{dS} = \frac{\mu_0}{4\pi} I(t). \ \int\int_S \int_P \left( \overrightarrow{dl} \wedge \frac{\overrightarrow{PM}}{PM^3} \right). \ \overrightarrow{dS},$$

where $\vec{S}$ is the surface vector normal to the coil.

By considering the system to be quasi-stationary, it is possible to calculate a set of k values for each coil of a particular measurement pattern 11, which values correspond to k different positions of the target pattern 16:

$$L_k = \frac{\mu_0}{4\pi}. \ \int\int_S \int_P \left( \overrightarrow{dl} \wedge \frac{\overrightarrow{PM}}{PM^3} \right). \ \overrightarrow{dS}$$

These $L_k$ terms represent the mutual inductance between the coil of the target pattern 16 and the coil of the measurement pattern 11 depending on the positions of the target pattern 16.

The resultant electromotive force is thus:

$$e(t) = -L_k. \frac{dI(t)}{dt}.$$

where I(t) and e(t) are sinusoidal electrical magnitudes at the frequency $f=\varphi/2\Pi$. Electromotive force measured on each coil of a measurement pattern 11 is thus:

$e=-jL_k \cdot \varphi I$.

Thus, for a current with a given value and at a given frequency, e is a function of the position of the target pattern 16 relative to the measurement pattern 11.

The electronic processor unit 4 acquires the measurement signals associated with all of the measurement patterns 11. Each measurement signal is an electromotive force.

Figure 4:
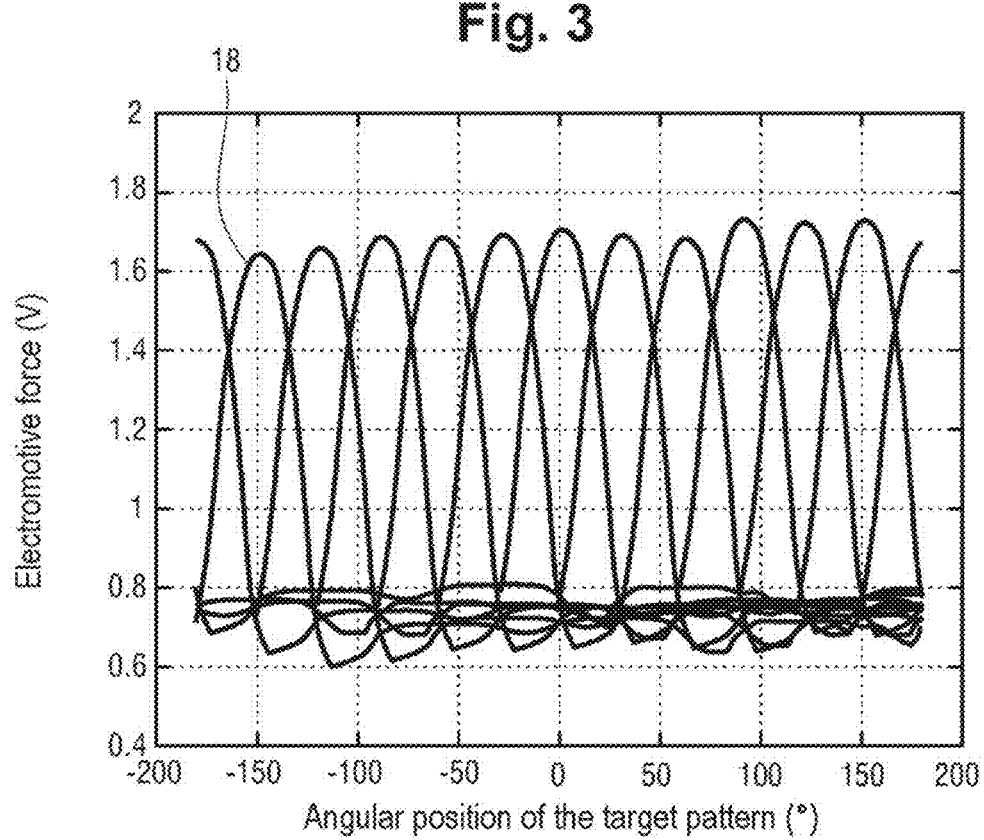
FIG. 4 is a graph plotting curves representing measurement signals picked up by measurement patterns of the first embodiment of the measurement device.

In FIG. 4, it can be seen that the electromotive force measured for a given measurement pattern 11 depends on the angular position of the target pattern 16 and thus of the second printed circuit 8 relative to said given measurement pattern 11. By way of example, it can thus be observed that the curve 18 for the electromotive force measured for a measurement pattern 11 positioned at −150° increases while the angular position of the target pattern 16 is going towards −150°, reaches a maximum when the angular position of the target pattern 16 reaches −150°, and then decreases while the angular position of the target pattern 16 is going away from −150°.

After acquiring the measurement signals, the electronic processor unit 4 measures the amplitudes of the measurement signals and determines from among the measurement signals a first measurement signal picked up by a first measurement pattern 11. The first measurement pattern is the measurement pattern closest to the target pattern 16, and among all the measurement signals, the first measurement signal is the measurement signal that presents the greatest amplitude.

Determining which measurement pattern is the first measurement pattern and knowing the angular position of said first measurement pattern makes it possible to define the angular position of the target pattern 16 to within 2Π/N, where N is the number of measurement patterns 11 (in this example, N=12). The angular position of each measurement pattern 11 can thus be estimated by the formula 2k·Π/N, where k is an index associated with said measurement pattern 11.

In order to improve accuracy when measuring the angular position of the target pattern 16 (and thus the position of the second printed circuit 8 and the position of the braked wheel 2), a calibration step is performed initially. By way of example, the calibration step may be performed in a laboratory or during manufacture of the tachometer or indeed directly on the aircraft after the tachometer has been installed.

This calibration step consists in causing the angular position of the target pattern 16 to vary and, for each angular position of the target pattern 16, in measuring the amplitude of the first measurement signal (as picked up by the first measurement pattern), and also the amplitudes of the measurement signals of the measurement patterns adjacent to the first measurement pattern (i.e. the measurement patterns situated directly to the left and to the right of the first measurement pattern).

Thereafter, the calibration step consists in determining, from among the adjacent measurement patterns, the second measurement pattern that is the measurement pattern next closest to the target pattern 16 after the first measurement pattern. The target pattern 16 is thus positioned between the first measurement pattern and the second measurement pattern.

Figure 5:
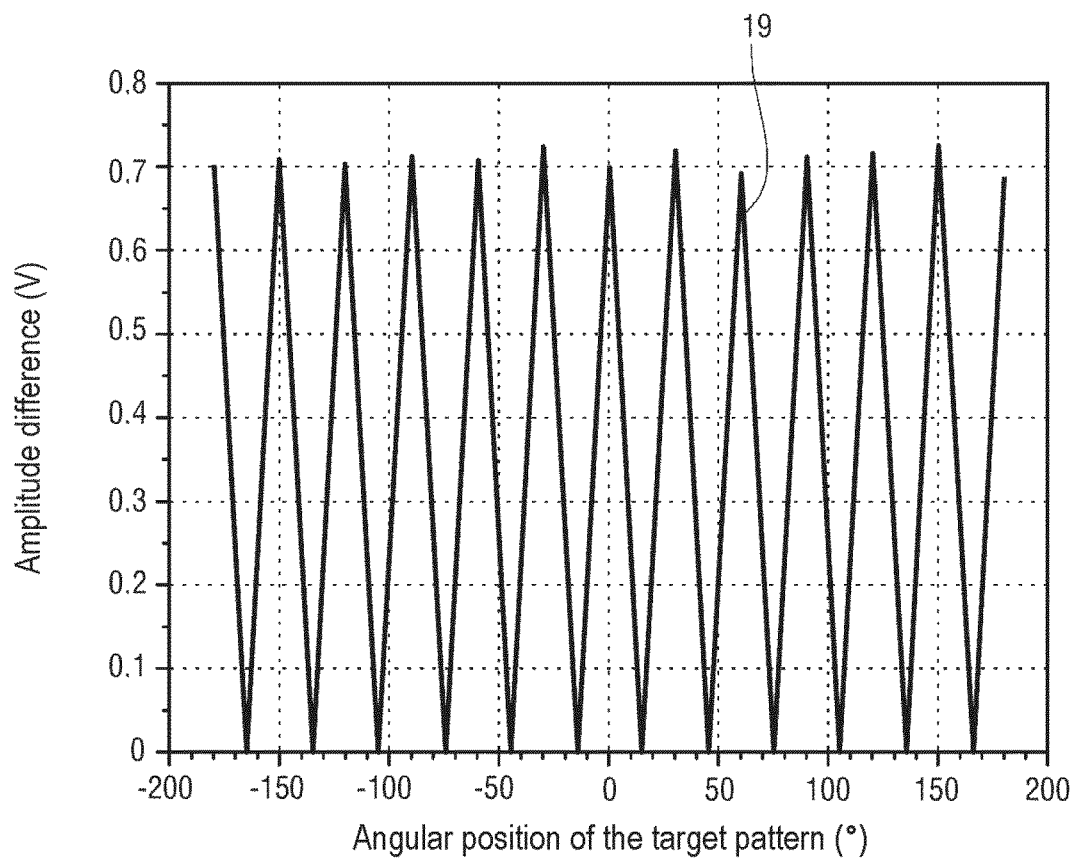
FIG. 5 is a graph plotting a curve for the difference between the amplitude of a first measurement signal and the amplitude of a second measurement signal.

With reference to FIG. 5, the calibration step further consists, for each angular position of the target pattern 16, in measuring the difference 19 between the amplitude of the first measurement signal and the amplitude of the second measurement signal as picked up by the second measurement pattern (or else a value representative of this difference). This produces 2*N (24 in this example) monotonic curve portions.

The angular positions and the associated measured values are then stored in a table that is itself stored in a memory of the electronic processor unit 4.

In operation, the angular position of the target pattern 16 is measured as follows.

The electronic processor unit 4 acquires the measurement signals and, from among the measurement signals, it determines the first measurement signal picked up by the first measurement pattern that presents the greatest amplitude. The position of the first measurement pattern thus provides a potentially not very accurate first estimate of the target pattern 16.

The electronic processor unit 4 compares the measurement signals associated with the adjacent measurement patterns, i.e. the measurement pattern situated directly to the left and the measurement pattern situated directly to the right of the first measurement pattern.

If the amplitude of the measurement signal from the measurement pattern situated to the left is greater than the amplitude of the measurement signal from the measurement pattern situated to the right, then the second measurement pattern is the measurement pattern situated to the left.

If the amplitude of the measurement signal from the measurement pattern situated to the right is greater than the amplitude of the measurement signal from the measurement pattern situated to the left, then the second measurement pattern is the measurement pattern situated to the right.

If the amplitude of the measurement signal from the measurement pattern situated to the right is equal to the amplitude of the measurement signal from the measurement pattern situated to the left, then no second measurement pattern is defined.

Thereafter, if the amplitude of the measurement signal from the measurement pattern situated to the right is equal to the amplitude of the measurement signal from the measurement pattern situated to the left, the electronic processor unit 4 determines that the accurate angular position of the target pattern 16 is equal to the position of the first measurement pattern (i.e. to $2k_0 \cdot \Pi / N$, where $k_0$ is the index associated with the optimum measurement pattern).

Otherwise, the electronic processor unit 4 evaluates the difference between the amplitude of the first measurement signal (associated with the first measurement pattern) and the amplitude of the second measurement signal (associated with the second measurement pattern), and acquires the accurate angular position of the target pattern 16 that corresponds to this difference in the table in memory. The accurate angular position of the target pattern is thus obtained as a function of the angular position of the first measurement pattern (it would also be possible to use the position of the second measurement pattern) and of the difference between the amplitude of the first measurement signal and the amplitude of the second measurement signal.

The electronic processor unit 4 then uses the accurate angular position of the target pattern 16 in order to determine the angular position of the second printed circuit 8, the angular position of the braked wheel 2, and the speed of rotation of the braked wheel 2.

Figure 6:
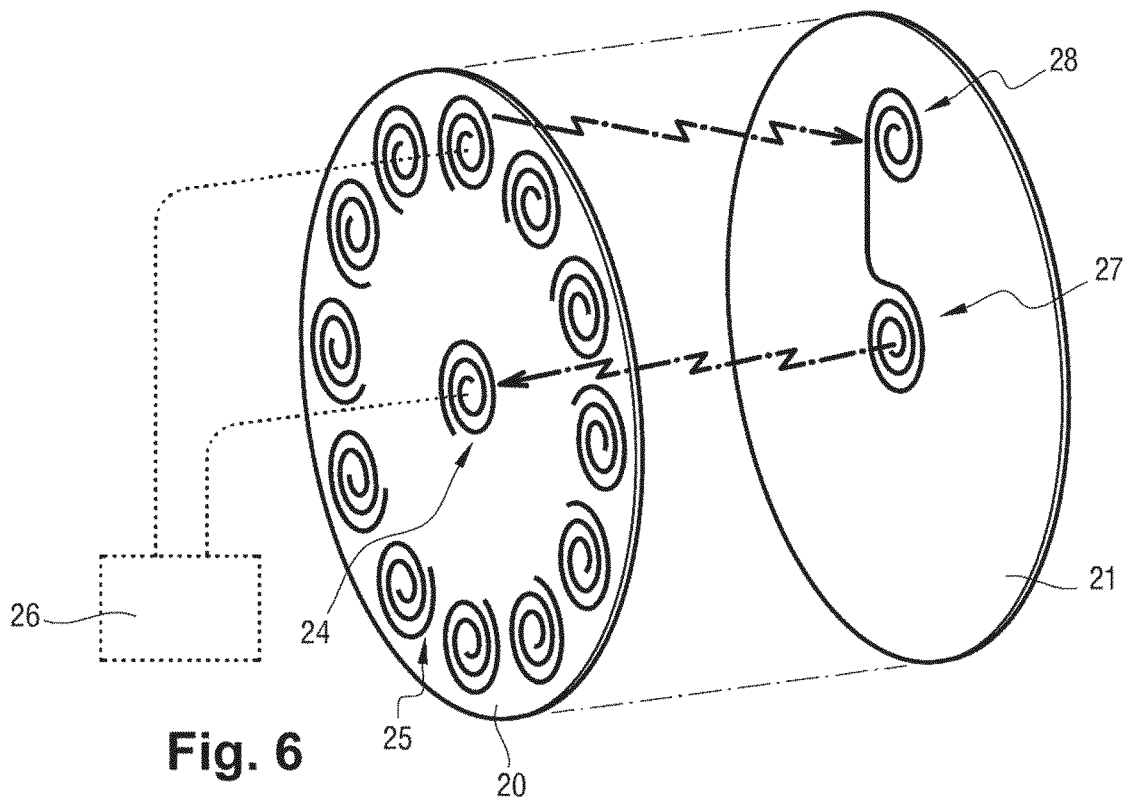
FIG. 6 shows first and second printed circuits of a second embodiment of the measurement device.

With reference to FIG. 6, there follows a description of the first and second printed circuits 20 and 21 of a second embodiment of a measurement device 22.

In this example, the first and second printed circuits 20 and 21 are both in the form of disks.

The first tracks define an emission pattern 24 and a plurality of measurement patterns 25, specifically twelve measurement patterns 25.

The emission pattern 24 lies at the center of the first printed circuit 20, and the measurement patterns 25 are distributed angularly in regular manner in the proximity of the circumference of the first printed circuit 20.

The emission pattern 24 presents an axis of revolution that coincides with the axis of rotation of the wheel, i.e. with the axis of the axle. In this example, the emission pattern 24 is a coil comprising a plurality of turns formed by a first track of the first printed circuit 20.

In this example, each measurement pattern 25 is a coil comprising a plurality of turns formed by a first track of the first printed circuit 20.

The electronic processor unit 26 is connected to the emission pattern 24 and also to the measurement patterns 25.

The second tracks define a reception pattern 27 and also a target pattern 28.

The reception pattern 27 lies at the center of the second printed circuit 21, and the target pattern 28 is positioned in the proximity of the circumference of the second printed circuit 21. The reception pattern 27 and the target pattern 28 are connected together by a second track.

The reception pattern 27 presents an axis of revolution that coincides with the axis of rotation of the wheel, i.e. with the axis of the axle. In this example, the reception pattern 27 is a coil comprising a plurality of turns formed by a second track of the second printed circuit 21.

In this example, the target pattern 28 is a coil comprising a plurality of turns formed by a second track of the second printed circuit 21.

Naturally, the invention is not limited to the embodiments described, but covers any variant coming within the ambit of the invention as defined by the claims.

In the description above, the measurement device is used to measure the angular position and the speed of rotation of a braked wheel of aircraft landing gear. The measurement device could naturally be used to measure the angular position and/or the speed of rotation of a wheel of some other type of vehicle, and indeed of any type of body that rotates relative to a fixed body in any type of application (in any technical field).

More generally, the measurement device may be used to measure any type of position, movement, or speed, of any body that is movable relative to a fixed body. The measurement device is thus entirely suitable for use in measuring positions and/or speeds that are linear.

The number, the positions, and the shapes of the patterns may be different from those described above. In particular, it should be observed that the patterns need not necessarily be coils, but they could be plane antennas of various shapes, for example. Under such circumstances, the coupling between the patterns of the first and second printed circuits would then be capacitive coupling rather than inductive coupling. The frequency of the excitation signal should be adapted to the patterns used.

The invention claimed is:

1. A measurement method for measuring the position of a movable body that is movable relative to a fixed body, the measurement method making use of a measurement device comprising a fixed portion for securing to the fixed body and a movable portion for securing to the movable body, the fixed portion including a first printed circuit having formed thereon first tracks defining at least one emission pattern and also a plurality of measurement patterns, the movable portion including a second printed circuit having formed thereon second tracks defining at least one reception pattern and also at least one target pattern, the first and second printed circuits being coupled together electromagnetically in such a manner that, when the emission pattern is excited by an excitation signal, an induced signal is received by the reception pattern and is then re-emitted by the target pattern, the measurement patterns then picking up measurement signals that are representative of the position of the target pattern, and thus also of the second printed circuit, of the movable portion, and of the movable body, the measurement method comprising the steps of:

determining a first measurement pattern that is the measurement pattern closest to the target pattern, the first measurement pattern picking up a first measurement signal that presents the greatest amplitude from among all the measurement signals;

determining a second measurement pattern that is the measurement pattern that is the next closest to the target pattern after the first measurement pattern, the second measurement pattern picking up a second measurement signal; and defining the position of the target pattern as a function of the position of the first measurement pattern or of the second measurement pattern, and as a function of the first measurement signal and of the second measurement signal.

2. The measurement method according to claim 1, further comprising the preliminary step of storing position values for the target pattern in a table in memory, each position value being associated with a value representative of the difference between the amplitude of the first measurement signal and the amplitude of the second measurement signal.

3. The measurement method according to claim 1, wherein the movable body is a body rotatable about an axis of rotation, and wherein the position of the movable body is an angular position.

4. The measurement method according to claim 3, wherein each of the emission pattern and the reception pattern presents a respective axis of revolution that coincides with the axis of rotation of the movable body.

5. The measurement method according to claim 3, wherein the emission pattern lies in the proximity of a circumference of the first printed circuit, and wherein the reception pattern lies in the proximity of a circumference of the second printed circuit.

6. The measurement method according to claim 3, wherein the emission pattern lies at the center of the first printed circuit, and wherein the reception pattern lies at the center of the second printed circuit.

7. The measurement method according to claim 3, the measurement patterns being angularly distributed in regular manner in the proximity of a circumference of the first printed circuit, and the target pattern being positioned in the proximity of a circumference of the second printed circuit.

8. The measurement method according to claim 1, the measurement device also being arranged to measure the speed of the movable body.

9. The measurement method according to claim 1, wherein at least one pattern from among the emission pattern, the measurement patterns, the reception pattern, and the target pattern is a coil.

10. The measurement method according to claim 1, the movable body being a vehicle wheel mounted on an axle in order to rotate about an axis of rotation, the fixed portion being for securing to the axle and the movable portion being for being driven in rotation by the wheel.

11. The measurement method according to claim 1, the measurement device being integrated in a tachometer.

12. The measurement method according to claim 11, the tachometer being arranged to measure the speed of rotation of a wheel of aircraft landing gear.

* * * * *